United States Patent Office 3,158,643
Patented Nov. 24, 1964

3,158,643
CYANOETHYLATED AMINOHYDROXY AMINES
Richard W. Fulmer, Minneapolis, and Edgar R. Rogier, Hopkins, Minn., assignors to General Mills, Inc., a corporation of Delaware
No Drawing. Filed May 5, 1961, Ser. No. 107,943
15 Claims. (Cl. 260—465)

This invention relates to new and useful cyanoethylated aminohydroxy amines.

The novel compounds of the present invention are represented by the formula:

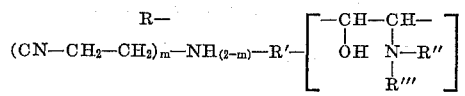

wherein R is hydrogen or a monovalent hydrocarbon radical having 1 to 21 carbon atoms, preferably 5 to 17 carbon atoms, R' is a divalent hydrocarbon radical of 1 to 21 carbon atoms, preferably 5 to 17 carbon atoms, the total number of carbon atoms in R and R' is in the range of 6 to 22 carbon atoms preferably 10 to 16 carbon atoms, R'' and R''' are selected from the group consisting of hydrogen, aliphatic and aryl radicals and m is an integer of 1 to 2.

The above formula represents two groups of isomeric compounds which may be illustrated by the formulas:

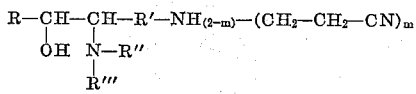

and

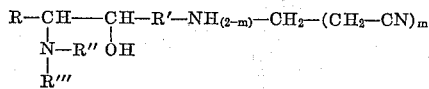

wherein R, R', R'', R''', and m are defined as above. Hereinafter the description will be restricted to one isomeric form; however, it will be understood that the description applies equally to both isomers.

The compounds of the present invention can be prepared from any higher unsaturated fatty acid having 8 to 24 carbon atoms. Illustrated below is a typical preparation of a 9-(N,N-substituted)-amino-10-hydroxystearyl (beta-cyanoethyl) amine from oleic acid:

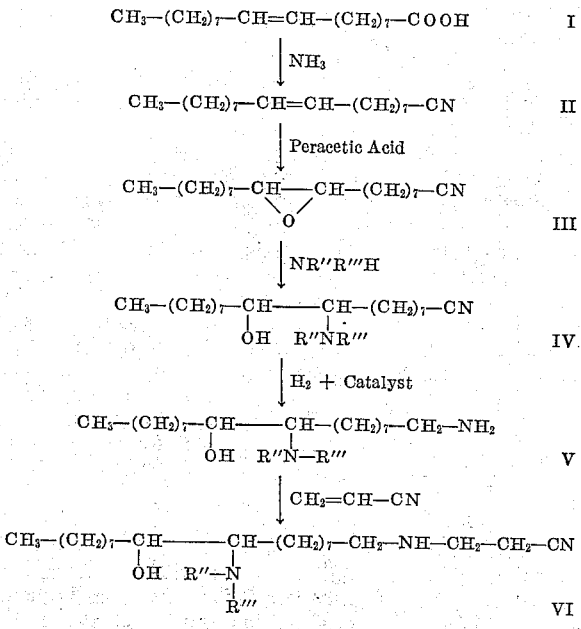

where R'' and R''' are hydrogen, aliphatic, or aryl radicals.

Thus, the (beta-cyanoethyl)-amino and hydroxy groups are on adjacent carbon atoms which carbon atoms are separated from the terminal amine group by at least one —$CH_2$— group.

The unsaturated fatty nitriles (II) can be prepared by reacting ammonia and a naturally occurring unsaturated higher fatty acid (I), such as oleic, erucic, oleostearic, linoleic, linolenic, clupanodonic, palmitoleic, and palmitolenic acids, forming thereby unsaturated fatty nitriles (II) having an even number of carbon atoms. Since higher fatty acids having an odd number of carbon atoms are rare, unsaturated fatty nitriles (II) having an odd number of carbon atoms are preferably prepared by the reaction of an unsaturated alkyl halide and an inorganic cyanide. The unsaturated higher fatty acids, supra, occur naturally in animal and vegetable fats and oils. The unsaturated alkyl halides may be prepared by converting an unsaturated fatty acid to an alcohol and subsequently reacting the alcohol with a halogen acid to form the unsaturated alkyl halide.

The unsaturated nitrile (II) is converted to the epoxy nitrile (III) by treatment with peracetic acid under typical epoxidation conditions. The epoxy nitrile (III) can be converted to the aminohydroxy nitrile (IV) by treatment with ammonia or any primary or secondary amino compound. If ammonia is used a primary aminohydroxy nitrile is formed, illustrated by the product IV wherein R'' and R''' are hydrogen. If a primary amino compound is used to open the epoxide ring of the epoxy nitrile (III) the product is a secondary amine, as illustrated by product IV wherein R'' is hydrogen and R''' is the radical derived from the primary amino compound reactant. Suitable primary amino compounds are the aliphatic primary amines such as methyl amine, ethyl amine, hexyl amine, octyl amine, stearyl amine, the aryl amines such as aniline and the amino phenols, the hydroxy alkyl amines containing from 1 to 4 carbon atoms, such as ethanol amine and the polyamines such as, ethylene diamine, diethylene triamine, triethyltetramine, and propylene diamine. Thus, it should be apparent that the primary amino compound used to react with the epoxy compound is most uncritical and, in fact, any primary amino compound, as well as ammonia, may be employed therefor.

Similarly the reaction is general as to the secondary amines. Among the preferred secondary amines are included dimethyl amine, methyl butyl amine, ethylstearyl amine, dibutyl amine, diethanolamine, morpholine, piperazine, and the like. The preparation of amino hydroxy nitriles is described in greater detail in the copending application of Edgar R. Rogier, S.N. 849,440, filed Oct. 29, 1959, now Patent No. 3,081,304.

The aminohydroxy amine (V) is prepared by the catalytic hydrogenation of the aminohydroxy nitrile (IV). Generally, any of the methods of the prior art used to hydrogenate nitriles to amines are suitable. A particularly satisfactory method utilizes Raney nickel and hydrogen at moderate temperatures (100 to 150° C.) and pressures (400 to 1500 p.s.i.g.). The preparation of aminohydroxy amines is described in the copending application of E. R. Rogier, S.N. 19,170, filed April 1, 1960.

The aminohydroxy amine (V) is cyanoethylated to produce the novel products of the present invention. In the illustration the product is the (N,N-disubstituted)-aminohydroxy-(beta-cyanoethyl)-amine or more specifically 9-(N,N-disubstituted)-amino - 10 - hydroxystearyl-(beta-cyanoethyl) amine. If more severe cyanoethylation conditions are employed, an additional mole of acrylonitrile can be added to the aminohydroxy amine to form a (N,N- disubstituted)-amino-hydroxystearyl-di-(beta-cyanoethyl) amine:

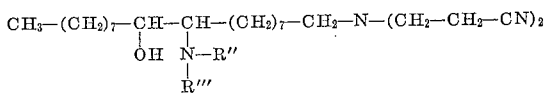

If the aminohydroxy amine is unsubstituted, that is, if in the preparation described above, the epoxy ring is cleaved with ammonia, then four moles of acrylonitrile can be added to each mole of aminohydroxy amine. Illustrating with the amine prepared from oleic acid, the compound of the structure:

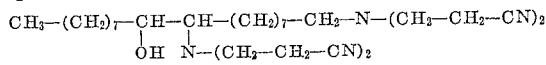

is formed. Viewed from the perspective of composition, the compound is one in which R'' and R''' described above, are beta-cyanoethyl. Generally the cyanoethylation occurs in the order:

(1) Addition to the amine group attached to a primary carbon atom (—R'—NH$_2$, described above).

(2) Addition to the amine group attached to a secondary carbon atom

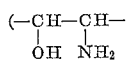

described above).

(3) A second addition to the amine group attached to a primary carbon atom.

(4) A second addition to the amine group attached to a secondary carbon atom.

Steps 1 and 2 occur readily, and often both go to completion even under mild conditions. In addition the products formed by steps 3 and 4 will be present in small amounts as side products when such mild cyanoethylation conditions are employed. When more severe conditions are employed, the major product will be the tricyanoethylated and/or tetracyanoethlyated product. The preferred reaction conditions to achieve each of the above results are illustrated in the examples.

Where the epoxide ring is opened by a primary amine in the preparation described above to form a (N-monosubstituted) aminohydroxy amine, then theoretically three moles of acrylonitrile can be added to such a product. Depending on the substituent on the nitrogen atom attached to the secondary carbon atom, the order of cyanoethylation is altered. In some cases the first two moles of acrylonitrile are added to the primary amine groups. In other cases, the second mole of acrylonitrile goes on the secondary amine. Under relatively severe cyanoethylation conditions, three moles of acrylonitrile can generally be added. In contrast to the ready dicyanoethylation which occurs with the unsubstituted aminohydroxy amines, when certain substituents are on the secondary amine group, only cyanoethylation at the primary amine group will occur under mild conditions. The anilinohydroxy amines typically behave in this manner.

If the epoxide ring is reacted with a polyamide compound such as ethylene diamine, propylene diamine, or diethylene triamine, the additional amine groups introduced into the molecule will also be cyanoethylated.

When an acid having more than one double bond is employed as a starting material each double bond is epoxidized, the epoxy ring opened by ammonia or an amine, the nitrogen atoms cyanoethylated, thereby forming a product having a plurality of hydroxyl substituents and a plurality of substituted amine substituents. For example, when linoleic acid is treated by the abovementioned preparatory procedure, there is formed a compound having the formula:

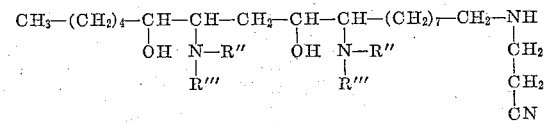

where R'' and R''' are as previously described. In addition to this compound, there are three position isomers wherein the positions of the hydroxyl and amino substituents on adjacent carbon atoms are reversed.

Another preferred starting acid is the mono-unsaturated hydrogenation product of linoleic acid. This product is a mixture of acids having unsaturation between the number 9 and 10 carbon atoms and acids having unsaturation between the number 12 and 13 carbon atoms. The 9–10 unsaturate is oleic acid which gives the 9(10)-(N,N-disubstituted)-amino-10(9)-hydroxystearyl (beta-cyanoethyl) amine by the above-illustrated route. The 12–13 unsaturate when treated by a similar procedure, gives the 12(13)-(N,N-disubstituted)-amino-13(12) - hydroxystearyl-(beta-cyanoethyl) amines which have the formula:

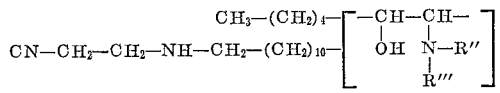

where R'' and R''' are as previously described.

Still another group of preferred products are those prepared from palmitoleic acid. These compounds have the formula:

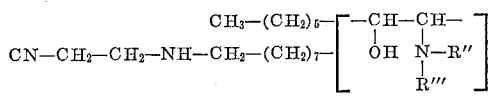

where R'' and R''' are as previously described.

Thus, the most preferred group of compounds are those represented by the formula:

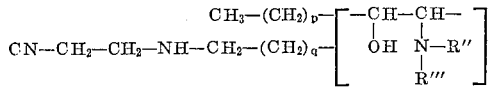

where R'' and R''' are as previously described and $p+q$ is 12 or 14.

As stated hereinbefore the preparation of the compounds of the present invention by the route illustrated above, will produce a mixture of two isomers since the epoxy ring may be split at either carbon to oxygen bond. In the reaction scheme shown above the isomers would be:

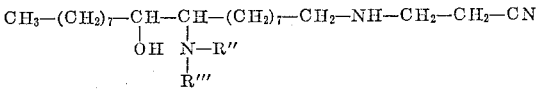

and

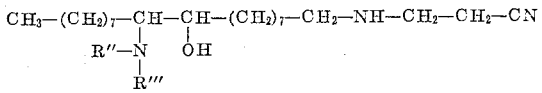

where R'' and R''' are as previously described. These groups of compounds are the 9-(beta-cyanoethyl)-amino-10 - hydroxystearyl - (beta - cyanoethyl) amines and 10-(beta - cyanoethyl)-amino-9-hydroxystearyl-(beta-cyanoethyl) amines, respectively. Isomers of this type are conveniently referred to by an alternative nomenclature, e.g., 9(10) - (beta - cyanoethyl) - amino - 10(9)-hydroxystearyl-(beta-cyanoethyl) amines, which would include both isomers given above.

The isomeric products produced by the above-described preparative procedures can be readily separated by conventional methods. Generally however, the mixture of isomers is as useful as the individual isomeric forms. In such cases, the separative process can be avoided.

In order to further illustrate various aspects of the present invention, as well as the preferred embodiments thereof, the following examples are included.

*Example I*

Into a 1 liter stirred flask was charged 438 g. of 9(10)-amino-10(9)-hydroxystearyl amine, 170 g. of acrylonitrile, and 60 g. of methanol. The mixture was heated at reflux temperature (80° C.) under nitrogen atmosphere for a period of 6.5 hours. Solvent and unreacted acrylonitrile were then stripped from the product at reduced pressures. The resulting product containing about 90% 9(10) - (beta - cyanoethyl)-amino-10(9)-hydroxystearyl-(beta-cyanomethyl) amine had a total amine number of 276, a secondary amine number of 245, a tertiary amine number of 27 and a hydroxyl number plus amine number of 365 as compared to theoretical values of 276, 276, 0 and 414, respectively. Carbon, hydrogen, and nitrogen analyses on the product indicated 70.9% carbon, 16.5% nitrogen, and 11.1% hydrogen as compared to theoretical values of 70.9% carbon, 13.8% nitrogen, and 11.4% hydrogen. About 10% of the product was the tricyanoethylated product, 9(10) - beta - cyanoethyl) - amino-10(9) - hydroxystearyl - di - (beta - cyanoethyl) amine, which accounts for the high nitrogen and low hydrogen values. Substantially the same results are obtained by substituting as a starting material, 9(10)-amino-10(9) hydroxypalmityl amine.

*Example II*

Into a 250 ml. stirred flask were charged 30 g. of 9(10)-dodecylamino-10(9)-hydroxystearyl amine, 10.2 g. acrylonitrile and 8 g. of methanol. The mixture was heated at reflux (65–78° C.) for 25 hours. The solvent and excess acrylonitrile were evaporated under reduced pressure at 80–90° C. and there was recovered 9(10)-(beta-cyanoethyl)dodecylamino-10(9) - hydroxystearyl - (beta-cyanoethyl) amine, having an amine number of 187 and a hydroxyl number of 105.6 as compared to theoretical values of 194.6 and 97 respectively. There is obtained 9(10)-anilino-10(9)-hydroxystearyl - (beta - cyanoethyl) amine by substituting 9(10)-anilino-10(9) hydroxystearyl amine for the starting material of this example.

*Example III*

Into a 100 ml. stirred flask were charged 20 g. of 9(10)-(beta-aminoethyl)-amino-10(9) - hydroxystearyl amine having a total amine number of 482, 12 g. acrylonitrile, and 20 g. of methanol. The reaction mixture was agitated at reflux (70° C.) for 48 hours. There was obtained 9(10) - beta - (beta-cyanoethyl)-aminoethyl-beta-cyanoethyl - amino-10(9)-hydroxystearyl-beta-cyanoethyl amine having a total amine number of 337 and a hydroxyl number of 333 as compared to the theoretical values of 331 for each determination. By substituting 9(10)-ethanol-amino-10(9)-hydroxystearyl amine as the starting material of this example there is obtained 9(10)-(beta-cyanoethyl)-ethanolamino-10(9) - hydroxystearyl - (beta-cyanoethyl) amine.

*Example IV*

Into a 500 ml. stirred flask were charged 62 g. 9(10)-amino-10(9)-hydroxystearyl amine having an amine number of 373, 16.6 g. distilled water, 24.9 g. methanol, 2.0 g. glacial acetic acid, 0.5 g. of 85% phosphoric acid. The solid amine melted as the mixture was heated to 40° C. Acrylonitrile was added dropwise over a period of ten minutes causing the temperature to rise to 58° C. The light yellow reaction mixture was then stirred at 70–74° C. for an additional 67 hours. The product was stripped of volatiles, dissolved in ether, washed with sodium carbonate and water, dried and the product recovered. The product contained approximately 38% of the tetracyanoethylated product, 9(10) - di - (beta-cyanoethyl)-amino-10(9) - hydroxystearyl - di - (beta-cyanoethyl) amine. Virtually all of the remaining material was the tricyanoethylated product, 9(10) - (beta-cyanoethyl) - amino - 10-(9) - hydroxystearyl - di - (beta-cyanoethyl) amine. The composite product had a total amine number of 234, an amine number of 158 after acetylation with acetic anhydride (a measure of tertiary amine groups) and a hydroxyl number of 187. The theoretical amine number for tricyanoethylated product was 245, and 218 for the tetracyanoethylated product.

*Example V*

Example IV was repeated and there was recovered a product having a total amine number of 243, a tertiary amine number of 154 and a hydroxyl number of 211. Into a 500 ml. stirred flask were charged 69 g. of this product, 20 g. acrylonitrile, 20 g. methanol, and 10 g. of methanol-wet Dowex 50W–X4 ion exchange resin made by Dow Chemical Co., Midland, Michigan. After 100 hours at 70° C., the reaction mixture was cooled and the product treated as in Example IV. The composite product had a total amine number of 236 and an amine number of 193 after acetylation with acetic anhydride (a measure of the tertiary amine groups).

Substantially the same results are obtained by substituting for the starting materials of the examples any aminohydroxyalkyl amine.

The foregoing examples are intended as illustrations of various embodiments of the invention and are not to be interpreted as limitations on the scope thereof.

The compounds of the present invention are useful as chemical intermediates, plasticizers for vinyl resins, additives for fuel oils, and corrosion inhibitors.

The embodiments of the invention in which an exclusive property or privilege is claimed, are defined as follows:

1. (Beta - cyanoethyl) - aminohydroxystearyl - (beta-cyanoethyl) amine wherein the (beta-cyanoethyl)-amino and hydroxy groups are on adjacent carbon atoms which carbon atoms are separated from the terminal amine group by at least one —$CH_2$— group.

2. 9 - (beta-cyanoethyl) - amino - 10 - hydroxystearyl-(beta-cyanoethyl) amine.

3. 10 - (beta-cyanoethyl) - amino - 9 - hydroxystearyl-(beta-cyanoethyl) amine.

4. 9 - (beta-cyanoethyl) - amino - 10 - hydroxystearyl-di-(beta-cyanoethyl) amine.

5. 10 - (beta-cyanoethyl) - amino - 9 - hydroxystearyl-di-(beta-cyanoethyl) amine.

6. 9 - (beta-cyanoethyl) - dodecylamino - 10-hydroxystearyl-(beta-cyanoethyl) amine.

7. 10 - (beta-cyanoethyl) - dodecylamino - 9-hydroxystearyl-(beta-cyanoethyl) amine.

8. 9 - anilino - 10 - hydroxystearyl - (beta-cyanoethyl) amine.

9. 10 - anilino - 9 - hydroxystearyl - (beta-cyanoethyl) amine.

10. 9 - beta - (beta-cyanoethyl) - aminoethyl - beta-cyanoethylamino - 10 - hydroxystearyl - (beta-cyanoethyl) amine.

11. 10 - beta - (beta-cyanoethyl) - aminoethyl - beta-cyanoethylamino - 9 - hydroxystearyl - (beta-cyanoethyl) amine.

12. 9 - (beta - cyanoethyl) - ethanolamino - 10 - hydroxystearyl-(beta-cyanoethyl) amine.

13. 10 - (beta - cyanoethyl) - ethanolamino - 9 - hydroxystearyl-(beta-cyanoethyl) amine.

14. 9 - di - (beta-cyanoethyl) - amino - 10 - hydroxystearyl-di-(beta-cyanoethyl) amine.

15. 10 - di - (beta-cyanoethyl) - amino - 9 - hydroxystearyl-di-(beta-cyanoethyl) amine.

References Cited in the file of this patent

Degering: "An Outline of Organic Nitrogen Compounds," pages 694, 699, 701; 1945.

Bergmann: "Acetylene Chemistry" (1948), page 80.

UNITED STATES PATENT OFFICE
CERTIFICATE OF CORRECTION

Patent No. 3,158,643                             November 24, 1964

Richard W. Fulmer et al.

It is hereby certified that error appears in the above numbered patent requiring correction and that the said Letters Patent should read as corrected below.

Column 1, lines 34 to 37, the formula should appear as shown below instead of as in the patent:

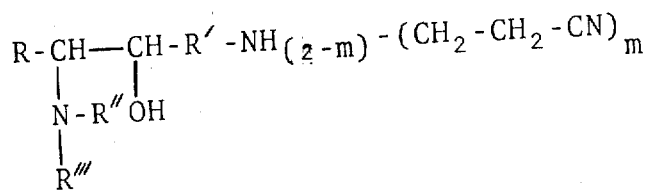

column 2, lines 9 and 10, for "oleostearic" read -- eleostearic --; column 5, line 5, for "(beta-cyanomethyl)" read -- (beta-cyanoethyl) --.

Signed and sealed this 27th day of April 1965.

(SEAL)
Attest:

ERNEST W. SWIDER
Attesting Officer

EDWARD J. BRENNER
Commissioner of Patents